United States Patent
Pang et al.

(10) Patent No.: US 11,652,881 B2
(45) Date of Patent: *May 16, 2023

(54) MIRRORING TO MULTIPLE DESTINATIONS USING A MONITORING FUNCTION

(71) Applicant: Arista Networks, Inc., Santa Clara, CA (US)

(72) Inventors: James C. Pang, Vancouver (CA); Bidong Chen, Surrey (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,128

(22) Filed: Jan. 5, 2022

(65) Prior Publication Data
US 2022/0131939 A1    Apr. 28, 2022

Related U.S. Application Data

(63) Continuation of application No. 16/781,873, filed on Feb. 4, 2020, now Pat. No. 11,252,230.

(51) Int. Cl.
*H04L 45/74* (2022.01)
*H04L 67/1095* (2022.01)
*H04L 12/18* (2006.01)

(52) U.S. Cl.
CPC .......... *H04L 67/1095* (2013.01); *H04L 12/18* (2013.01); *H04L 45/74* (2013.01)

(58) Field of Classification Search
CPC ..... H04L 12/18; H04L 12/1854; H04L 45/74; H04L 67/1095
See application file for complete search history.

(56) References Cited

U.S. PATENT DOCUMENTS

| | | | |
|---|---|---|---|
| 10,038,624 B1 * | 7/2018 | Cruz | H04L 45/16 |
| 10,454,833 B1 | 10/2019 | Bosshart et al. | |
| 10,805,199 B1 | 10/2020 | Ramabadran | |
| 2007/0183415 A1 * | 8/2007 | Fischer | H04L 49/3009 370/469 |
| 2016/0248656 A1 | 8/2016 | Anand et al. | |
| 2021/0243253 A1 | 8/2021 | Pang et al. | |
| 2021/0399988 A1 * | 12/2021 | Labonte | H04L 47/25 |

* cited by examiner

*Primary Examiner* — Mansour Oveissi
(74) *Attorney, Agent, or Firm* — Fountainhead Law Group P.C.

(57) ABSTRACT

In some embodiments, a method processes a first packet and generates a first copy of the first packet as a second packet. The method sends second copies of the first packet to a first group of multiple destinations defined by a first address. Also, the method sends the second packet to an interface with a loopback function. The interface recirculates the second packet for further processing. The second packet is processed where the second packet is assigned a destination of a second address. Then, the method sends copies of the second packet to a second group of multiple destinations defined by the second address.

20 Claims, 8 Drawing Sheets

MIRRORING TO MULTIPLE DESTINATIONS USING A MONITORING FUNCTION

CROSS REFERENCE TO RELATED APPLICATION

This application is a continuation of U.S. application Ser. No. 16/781,873, filed Feb. 4, 2020, the contents of which are incorporated herein by reference for all purposes.

BACKGROUND

A chip in a network device may support a monitoring function, which makes a copy of a first packet (referred to a second packet) and sends the second packet to a different destination than the first packet. For example, the first packet may have a destination of a first destination address and the second packet created by the monitoring function may have a destination of a second destination address. The monitoring function may be used when an entity may want to monitor the traffic from, or being sent to, a specific address.

In some examples, the first packet may be sent to multiple destinations, such as to multiple destinations simultaneously where each of the destinations receives a copy of the first packet. The multiple destinations may be programmed into a multicast address that defines the destination addresses. The chip may support sending the first packet to the multiple destinations. However, the monitoring function may send the second packet to multiple destinations (e.g., a different multicast address). In some cases, the packet processing chip may not support sending the second packet created by a monitoring function to the multiple destinations.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a network device. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A network device receives a first packet that is sent to a first destination address, such as a first group of multiple destinations. A component, such as a computer chip, in the network device may include a monitoring function that may make a copy of the first packet to create a second packet. In some cases, the second packet may be sent to a second destination address, such as a second group of multiple destinations (e.g., a second multicast group). The chip in the network device may not natively support the sending of the second packet from the monitoring function to the multiple destinations. For example, the chip may consider the second packet as a mirrored packet when generated by the monitoring function and the chip may not natively support sending mirrored packets to multiple destinations. However, the chip does support sending the first packet to the first group of multiple destinations.

When the chip does not support sending the second packet to multiple destinations, some embodiments overcome the restriction by sending the second packet to an interface with a loop-back function. A loop-back function is any device/ function that redirects what it received in its ingress port back to its egress port. For example, the loop-back function recirculates (e.g. loops) the second packet, either internal in the chip or external to the chip, with the loop-back function. This recirculation allows the chip to forward the second packet to the second destination address. For example, using the loop-back function changes the second packet from a mirrored packet to a forwarded packet, and an ingress pipeline can send the forwarded second packet to the second group of multiple destinations. The recirculation of the second packet overcomes the restriction of not being able to send a mirrored packet from the monitoring function to the second group of destinations. That is, the chip can send a forwarded packet to the second group of destinations.

A network device may provide different interfaces with a loop-back function, such as an internal loop-back interface in the chip, an interface in a media access controller (MAC), a physical layer interface, and a line interface that physically loops the second packet back. The chip could add metadata to the packet to add a second destination that represents a second group of multiple destinations so that the ingress pipeline can recognize that this recirculated packet is to be sent to the second group of multiple destinations. Also, the interface can be configured with a profile such that all packets received from a port for that interface are forwarded to a second destination that represents the second group of multiple destinations.

System Overview

Figure 1:
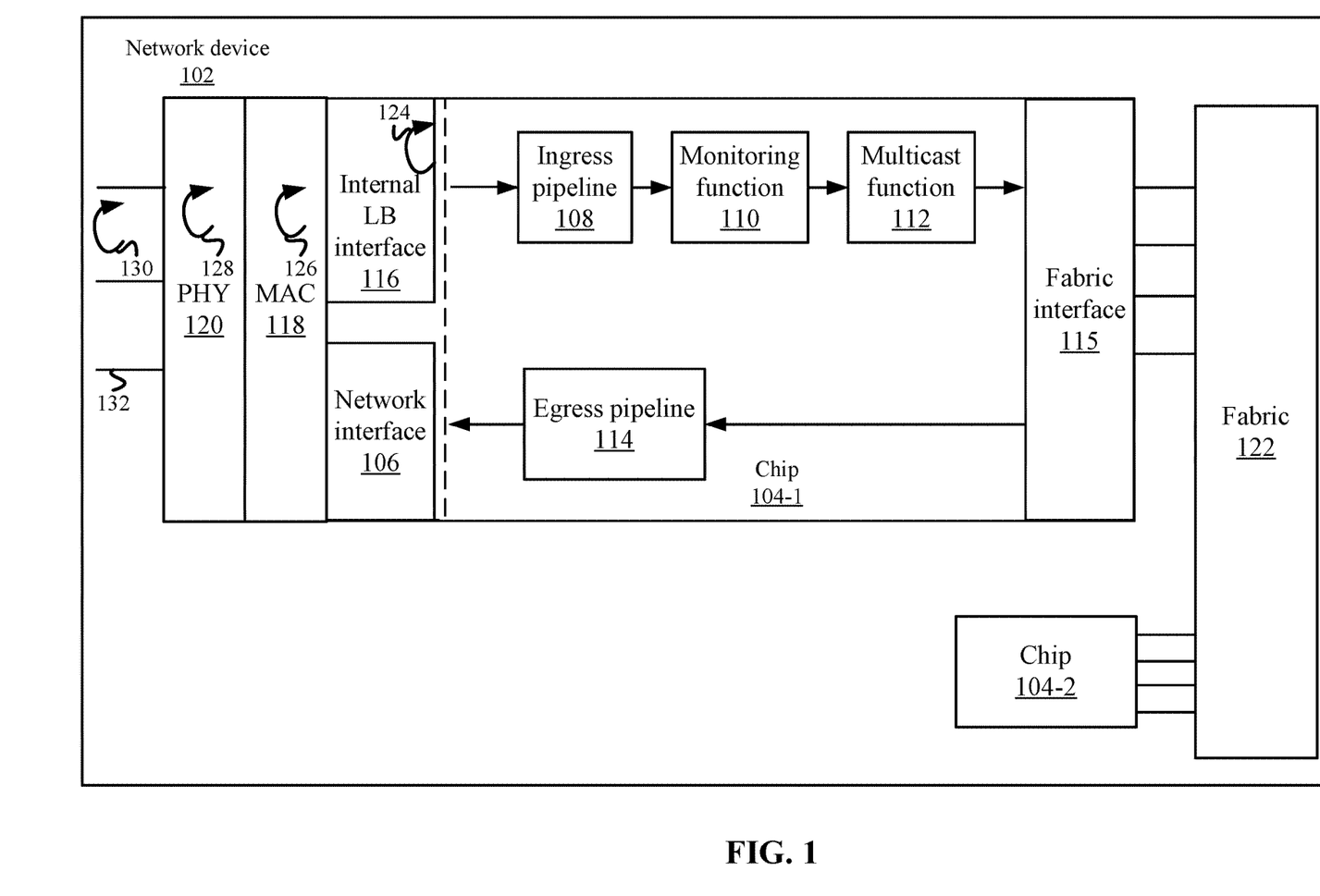
FIG. 1 depicts an example of a network device according to some embodiments.

FIG. 1 depicts an example of a network device 102 according to some embodiments. Network device 102 may be a switch, router, or other packet processing device. Network device 102 may include multiple chips, shown as chips 104-1 to 104-2, but any number of chips may be appreciated. In some embodiments, chips 104 may be application-specific integrated circuits (ASICs) that process packets. Network device 102 may also include other components that are not shown.

Chips 104 (e.g., chip 104-1 and 104-2) may include similar components. For example, each chip 104-1 and 104-2 may include an ingress pipeline 108, a monitoring function 110, a multicast function 112, an egress pipeline 114, a fabric interface 115, a network interface 106, and an internal loop-back (LB) interface 116. A media access controller (MAC) 118 and physical (PHY) interface 120 may be included in network device 102. Media access controller 118 may be located outside of chip 104, but may also be integrated within chip 104. Physical layer interface 120 may also be located outside of chip 104. Also, physical lines 132 may be coupled to network device 102.

When network device 102 receives a first packet, ingress pipeline 108 processes the first packet to perform different functions, such as preparing the first packet for forwarding to its next destination.

Monitoring function 110 creates a copy of the first packet, which may be referred to as a second packet. The second packet may be a copy in that data for the first packet is copied to generate the second packet. However, additional information may be added to the second packet or changed in the second packet after generating the copy of the first packet. For example, if data (e.g., specific keywords, network protocols, or any other data) in the first packet matches a rule that states the first packet should be monitored, monitoring function 110 may create a copy of the first packet to create the second packet. In some examples, the second packet may be sent to a different destination than the first packet.

In some embodiments, the first packet is sent to a group of multiple destinations. For example, multicast function 112 is configured to resolve a group address to a group of multiple destinations. The group address may be a multicast address (e.g., a single address) that is associated with the group of multiple addresses. Multicast function 112 may resolve the group address to the group of multiple destinations and send copies of the first packet to each destination in the group of multiple destinations, such as by sending the copies of the first packet to multiple interfaces associated with destination addresses for the group of multiple destinations.

Fabric interface 115 may be an interface to fabric 122. Fabric 122 is an internal network in network device 102 that may couple chip 104-1 to chip 104-2, and other components. As will be discussed below, chip 104-1 may perform some aspects of the process and chip 104-2 may perform other aspects of the process. That is, a single chip 104 does not need to perform the entire processing of the first packet and the second packet.

An egress pipeline 114 processes packets that are being sent to network interface 106. For example, egress pipeline 114 may process packets being sent externally to chip 104-1 (and network device 102) via network interface 106.

As discussed above, chip 104-1 may not natively support sending the second packet that is generated by monitoring function 110 to a group of multiple destinations. Chip 104-1 may consider the second packet a mirrored packet and chip 104-1 may not support sending mirrored packets to multiple destinations. A mirrored packet may be a copy of a packet that is generated by monitoring function 110. To overcome this restriction, chip 104-1 may use different interfaces with loop-back functions to send a second packet to a group of multiple destinations. For example, chip 104-1 may use internal loop-back interface 116, media access controller 118, physical layer interface 120, or a line interface (e.g., a physical connection device) coupled to network device 102.

Chip 104-1 may use internal loop-back interface 116 by sending the second packet to internal loop-back interface 116. Internal loop-back interface 116 may be internal to chip 104-1 and include a loop-back function 124. The loop-back function 124 recirculates the second packet within chip 104-1 to ingress pipeline 108.

Media access controller 118 may include a loop-back function at 126. Media access controller 118 may perform layer 2 functions, such as processing a MAC address of packets. Chip 104-1 may use loop-back function 126 of media access controller 118 by sending the second packet through egress pipeline 114 and network interface 106 to media access controller 118. Media access controller 118 may then send the second packet back to chip 104-1, such as through network interface 106 to ingress pipeline 108. Media access controller 118 may recirculate packets received on a port back to ingress pipeline 108, such as via the same port or via another port. A port may include two paths: a first path to receive traffic from the network (e.g., the ingress or receiver side), and a second path to send traffic to the network (e.g., the egress or transmitter side). The two sides can function independently and simultaneously. For example, the egress side of a port is looped back to the ingress side of the same port. When a packet is sent out through the egress port, the packet comes back immediately through the ingress side port.

Similarly, chip 104-1 may use the loop-back function 128 of physical layer interface 120 by sending the second packet through an egress pipeline 114 and network interface 106 to physical layer interface 120. Physical layer interface 120 may be an interface for media control layer (MAC) to a physical line interface. In some embodiments, physical layer interface 120 may be a physical layer driver circuit. A line interface may be coupled in between physical layer interface 120 and lines 132. The line interface may include transmitters and receivers that transmit and receive data. Physical layer interface 120 may include a loop-back function 128 to send the second packet back to chip 104-1, which processes the second packet in ingress pipeline 108. Similar to media access controller 118, physical layer interface 120 may recirculate packets received on a port back to ingress pipeline 108, such as via the same port or via another port.

Also, instead of configuring physical layer interface 120 with loop-back function 128, a line interface may include a physical connection that may loop back a line 132 to physically provide a loop-back function at 130. For example, the line interface may send the second packet out on one line 132, which loops a line interface's egress side to its ingress side. For example, the loop may be a physical cable (e.g., fiber) that links the egress side of the port to the ingress side of the same port or a different port. For example, an egress transmitter is connected via a coupled cable/fiber to the ingress receiver of the same port. The packet is then sent back to physical layer interface 120 via the coupled cable and another line 132. Physical layer interface 120 can then send the second packet back to chip 104-1 and ingress pipeline 108. Accordingly, in some embodiments, loop-back functions 124, 126, and 128 may be implemented in software and loop-back function 130 may be implemented in hardware.

When the second packet is recirculated back to ingress pipeline 108, chip 104-1 may process the second packet as a forwarded packet and not a mirrored packet that was generated by monitoring function 110. The forwarded packet may be a packet that is received from one of media access controller 118, physical layer interface 120, and/or the line interface for forwarding by ingress pipeline 108. The forwarded packet has the mirrored packet designation removed such that ingress pipeline 108 does not recognize the second packet as being generated by monitoring function 110. This allows chip 104-1 to send the forwarded packet to a group address that is associated with a group of multiple destinations. That is, chip 104-1 can natively send forwarded packets to a group address, but not mirrored packets. The recirculation allows the second packet to be changed from a mirrored packet to a forwarded packet.

The configuration to forward the second packet to multiple destinations may be implemented using different methods. For example, chip 104-1 may add metadata to the second packet to add a second group address that represents the second group of multiple destinations. For example, ingress pipeline 108 may add internal metadata to the first packet, which is metadata attached to the first packet that is used by components inside chip 104-1. The internal metadata is removed before the first packet is sent outside of chip 104-1. In some embodiments, the internal metadata may include metadata that is added to a copy of the first packet that is created by a monitoring function 110. The internal metadata may be used to specify a second destination address for the copy of the first packet, which will be discussed later. Then, ingress pipeline 108 can recognize that the second packet is being recirculated and is able to forward to the second group of multiple destinations. Also, an interface may be configured with a profile such that all packets received from that interface (e.g., a port of the interface) are forwarded to the second group address that is associated with the second group of multiple destinations. For example, if only a single loop-back interface 116 is being used per group of multiple destinations, a profile for the loop-back interface ingress side can be configured to forward the second packet to the second group of multiple destinations. Each port/interface, specifically the ingress port side of an interface, may be configured with a forwarding profile to direct all packets received to a specific destination. The profile may be considered default forwarding and works like a cross-connect. That is, no bridging or routing or any other lookup may be involved.

It is noted that the loop-back function does not need to be performed via chip 104-1. For example, chip 104-1 may send the second packet to an internal loop-back interface 116 in chip 104-2. Additionally, the second packet may be sent to loop-back functions by another chip 104, such as the second packet may be sent via fabric interface 115 and fabric 122 to chip 104-2. Chip 104-2 may then send the second packet to its internal loop-back interface 116, media access controller 118, physical layer interface 120, or the line interface. Further, an ingress pipeline 108 of chip 104-2 may process the second packet that is recirculated by the loop-back function. For example, the second packet may be sent via fabric interface 115 and fabric 122 to chip 104-2 for forwarding to the second group of destinations. The following will describe the processing with respect to chip 104-1, but it will be understood that the processing described may be distributed to other chips 104.

Monitoring Function

Figure 2:
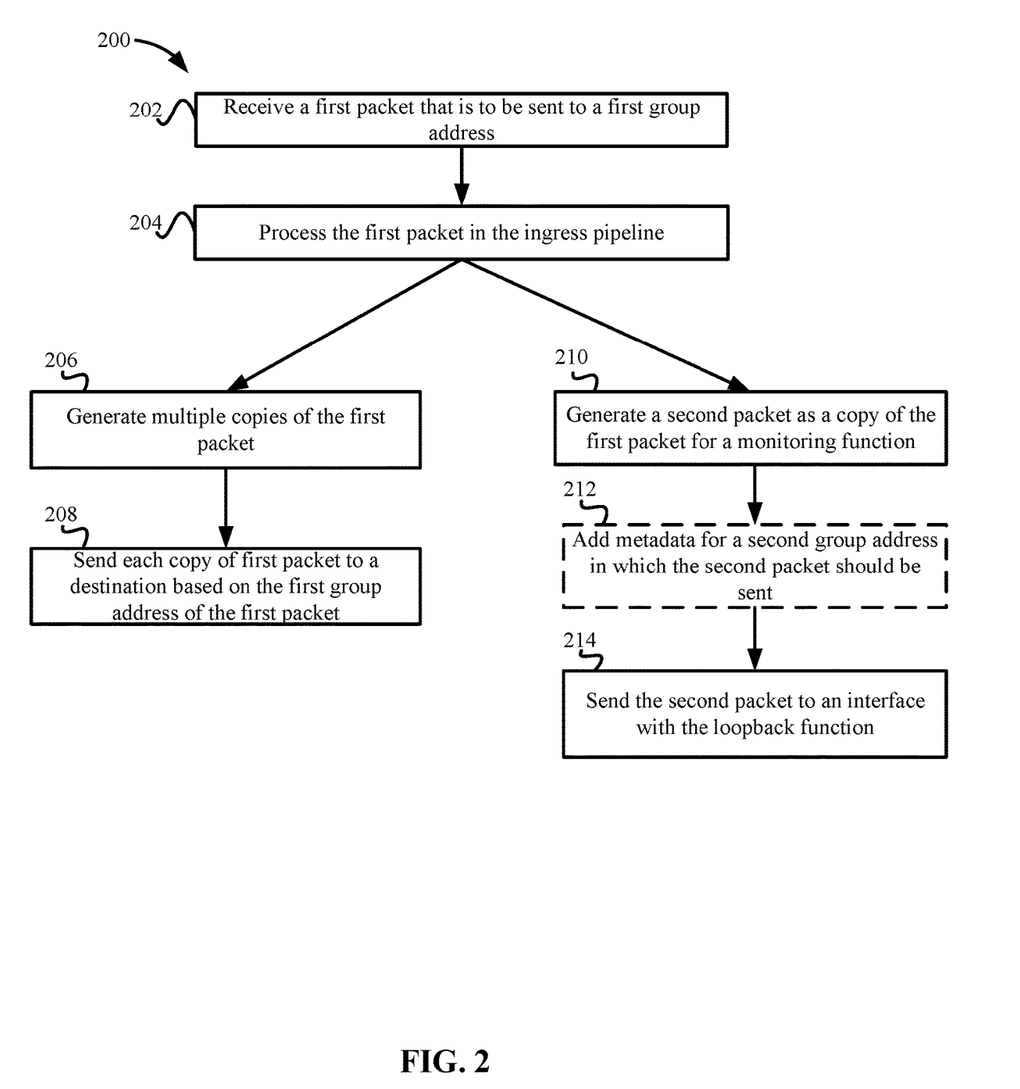
FIG. 2 depicts a simplified flowchart for processing a first packet to be monitored according to some embodiments.

The following will describe a general method to process packets generated by monitoring function 110 according to some embodiments. FIG. 2 depicts a simplified flowchart 200 for processing a packet to be monitored according to some embodiments. At 202, chip 104-1 receives a first packet that is to be sent to a first group address. The first group address may be a multicast address that defines a group of multiple destinations. For example, the first group address may resolve to multiple destinations in which a copy of the first packet is sent.

At 204, chip 104-1 processes the first packet in ingress pipeline 108. When the first packet is to be sent to the first group address, at 206, chip 104-1 generates multiple copies of the first packet for the first group of multiple destinations. Then, at 208, chip 104-1 sends each copy of the first packet to a destination based on the first group address of the first packet, such as to an interface associated with each of the first group of multiple destinations. The above processing may be performed to multicast copies of the first packet to the first group of multiple destinations.

In addition to the above processing of the first packet, at 210, chip 104-1 may generate a second packet as a copy of the first packet for a monitoring function. For example, monitoring function 110 may determine that the first packet should be monitored and generates the second packet as the copy.

As discussed above, chip 104-1 may use different methods to forward the second packet to a second group address that is associated with a second group of multiple destinations. For example, optionally, at 212, chip 104-1 may add metadata for the second group address in which the second packet should be sent. This metadata may be used upon recirculation of the second packet to forward the second packet to a second group address. Alternatively, a profile may be configured for the loop-back interface to forward all packets received from the loop-back interface to the second group address. At 214, chip 104-1 sends the second packet to the interface with the loop-back function. As discussed above, the interface may be an internal loop-back interface 116, media access controller 118, physical layer interface 120, and/or the line interface, but other interfaces may be appreciated.

Processing After Recirculation

Figure 3:
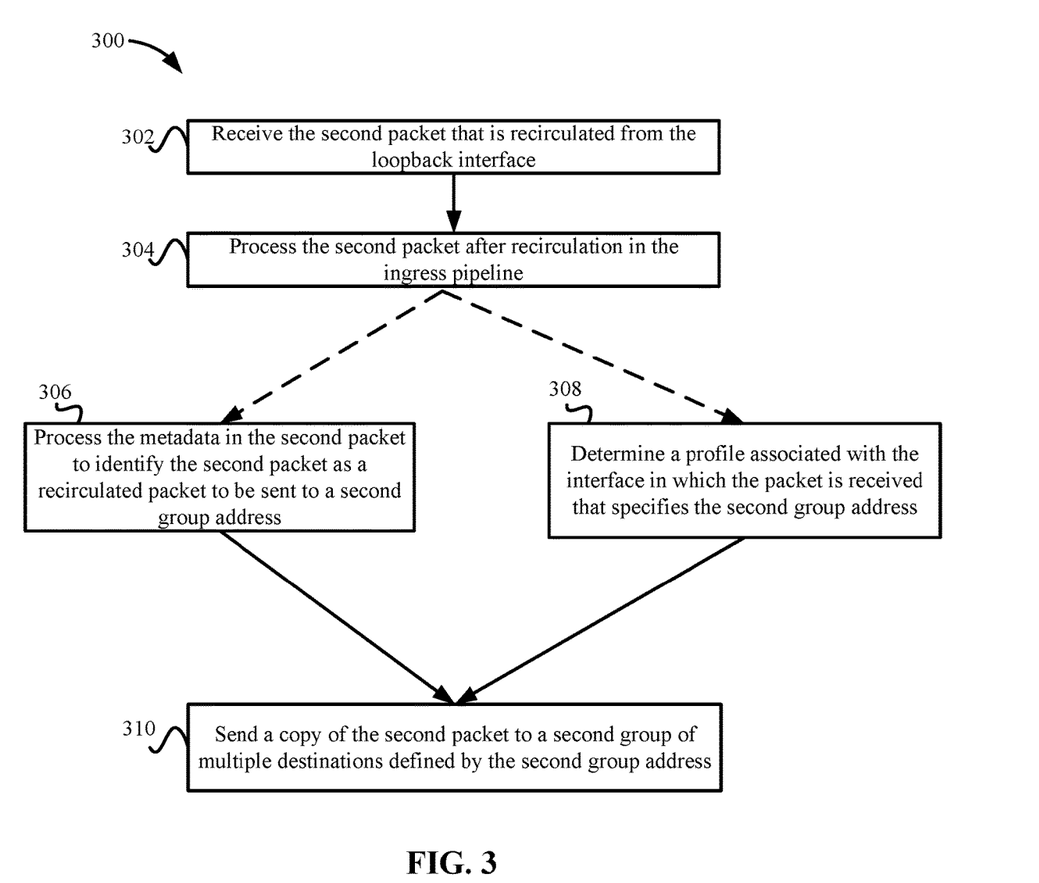
FIG. 3 depicts a simplified flowchart of a method for processing a second packet according to some embodiments.

The second packet may then be processed by the loop-back interface and recirculated, such as back to chip 104-1, but could be recirculated back to chip 104-2. FIG. 3 depicts a simplified flowchart 300 of a method for processing the second packet according to some embodiments. At 302, chip 104-1 receives a second packet that is recirculated from the loop-back interface. Loop-back interface 116 may use a loop-back function to recirculates the second packet internally within chip 104-1 or external to chip 104-1. At 304, chip 104-1 processes the second packet after recirculation in ingress pipeline 108. Chip 104-1 may then perform either of the below that is described in 306 or 308 based on how the processing of a recirculated packet is configured.

In a first option, at 306, chip 104-1 processes the metadata in the second packet to identify the second packet as a forwarded packet to be sent to a second group address. For example, the metadata in the packet may indicate that the second packet is a forwarded packet to the second group address. Chip 104-1 may then determine the second group address, such as from the metadata. It is noted that since the second packet is a copy of the first packet, the second packet may still have the same destination address of the first packet. However, chip 104-1 uses the metadata to resolve the destination of the second packet to the second group address.

Alternatively, in a second option at 310, chip 104-1 may determine a profile associated with the interface in which the packet is received, such as a port. The profile may be associated with the second group address in that all packets received from the interface are sent to the second group address.

Then, at 310, chip 104-1 sends a copy of the second packet to a second group of multiple destinations defined by the second group address. Accordingly, chip 104-1 circumvents the native restriction of not being able to send a copy of a packet generated by monitoring function 110 to a second group address. Recirculation of the second packet allows chip 104-1 to treat the second packet as a forwarded packet, which can be sent to the second group of multiple destinations defined by the second group address.

The following will now describe the different loop-back functions that are available in more detail.

Internal Loop-Back Interface

Figure 4A:
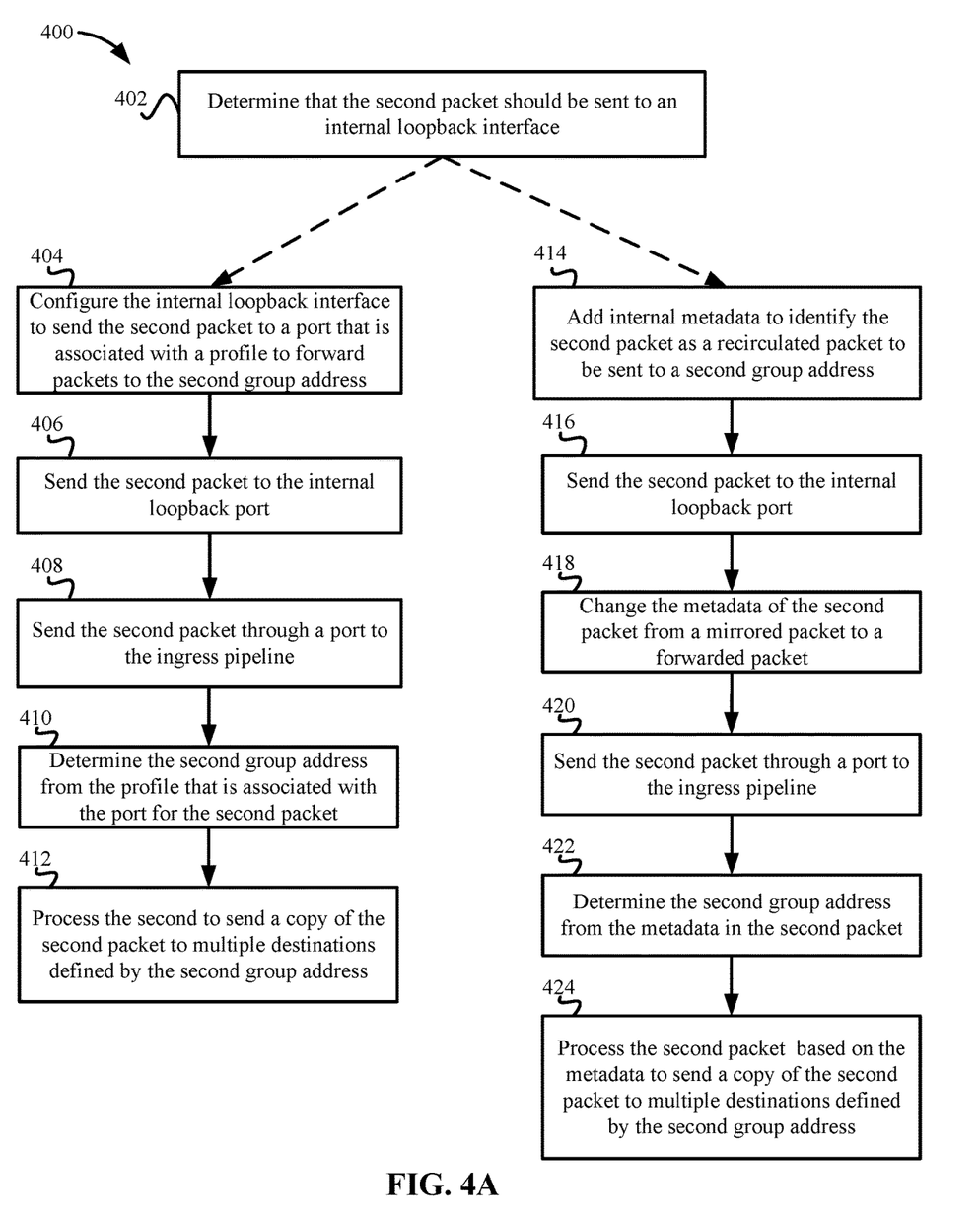
FIG. 4A depicts a simplified flowchart of a method that uses an internal loop-back interface according to some embodiments.

FIG. 4A depicts a simplified flowchart 400 of a method that uses internal loop-back interface 116 according to some embodiments. At 402, chip 104-1 determines that the second packet should be sent to internal loop-back interface 116. As discussed above, multiple methods may be used to perform the loop-back recirculation of the second packet. Two methods will be described where a first method using a profile that forwards packets to the second group address for all packets received from internal loop-back interface 116 and a second method that adds internal metadata to the second packet such that second packet can be identified as a forwarded packet that should be sent to a second group address upon recirculation. Chip 104-1 may perform any combination or either of the methods for packets.

Figure 4B:
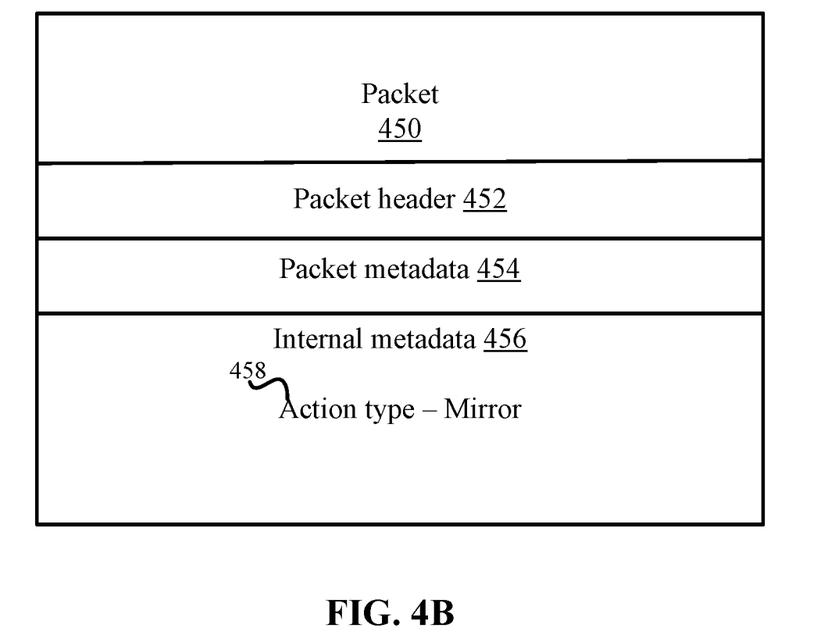
FIG. 4B depicts an example of a packet that is to be mirrored according to some embodiments.

In the first method of using the profile, at 404, chip 104 configures internal loop-back interface 116 to send the second packet to an ingress port that is associated with a profile to forward packets to the second group address. For example, every packet that is received at an ingress port to which internal loop-back interface 116 sends a packet is sent to the second group address. As mentioned above, internal loop-back interface 116 may have an egress port path and an ingress port path. The ingress port of internal loop-back interface 116 is connected to the egress packet processing pipeline 114. On the other hand, the egress port of internal loop-back interface 116 is connected to the ingress pipeline 108. In this case, chip 104 configures the mirroring on the original ingress port path to send a copy of the packet, with metadata added, to the internal loopback interface 116, which redirects the copied packet back to the ingress pipeline 108. The profile, which directs all received packets to a multicast group, is associated with the port ID representing internal loop-back interface 116. When the ingress pipeline 108 encounters a packet, it looks up default forwarding profiles based on the port ID from which the packet ingressed to the pipeline. Ingress pipeline 108 then sends the second packet to the multicast group as dictated by the profile. FIG. 4B depicts an example of a packet 450 that is to be mirrored according to some embodiments. Packet 450 includes a packet header 452 and packet metadata 456. Packet header 452 is used to route packet 450 and chip 104 uses packet metadata 456 to process packet 450. Also, packet 450 includes internal metadata 456. Internal metadata 456 includes "action type" metadata that specifies this packet is a mirrored packet.

At 406, chip 104-1 sends the second packet to internal loop-back interface 116. In this case, the second packet is recirculated within chip 104-1 and is not sent external to chip 104-1. Internal loop-back interface 116 receives the second packet and can recirculate the second packet. For example, at 408, internal loop-back interface 116 sends the second packet through a port to ingress pipeline 108.

At 410, ingress pipeline 108 determines the second group address from the profile that is associated with the port for the second packet. Then, at 412, ingress pipeline 108 processes the second packet to send a copy of the second packet to multiple destinations defined by the second group address. In this case, chip 104 treats the second packet that is received through the port as a forwarded packet to the second group address and not a mirrored packet by monitoring function 110.

Figure 4C:
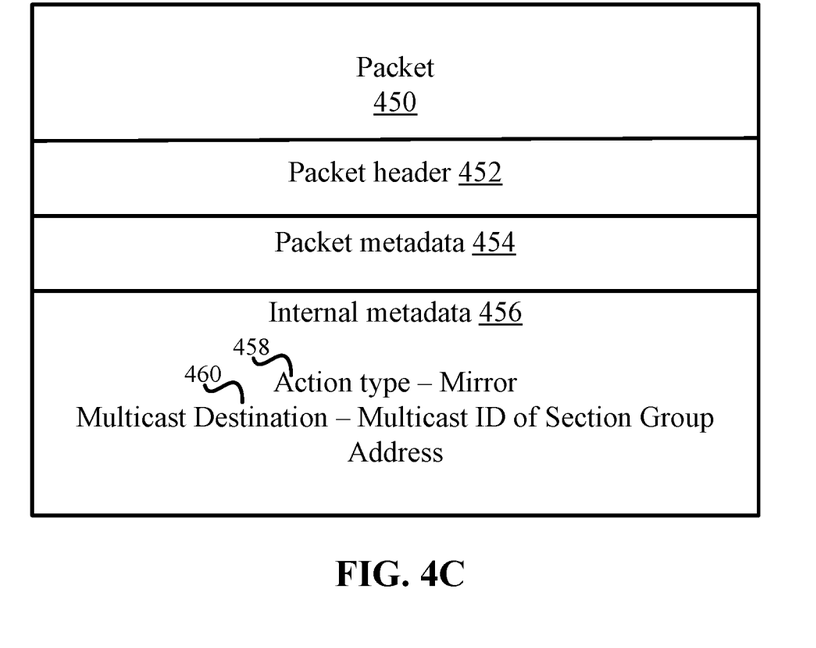
FIG. 4C depicts an example of a packet that includes the second group address according to some embodiments.

In the second method, chip 104 may add metadata to the second packet that specifies the second group address. At 414, chip 104-1 adds internal metadata to identify the second packet as a packet to be sent to a second group address. For example, the internal metadata may include the second group address. FIG. 4C depicts an example of a packet 450 that includes the second group address according to some embodiments. Internal metadata 456 includes "Multicast Destination" metadata that specifies the second group address, such as a multicast ID. The internal metadata may be used internally in chip 104-1, such as this internal metadata is not used outside of chip 104-1 and is stripped or removed when the second packet is sent external to chip 104-1 to a mirroring destination that is outside of chip 104-1, such as on a different chip. The internal metadata does not need to be transmitted over fabric 122 to the chip hosting the egress interface. However, in multichip systems, it is also possible for loopback interface 116 to be on a different chip than the one where the packet is received originally, and where the mirroring action takes place. In this case, the internal metadata may pass through the fabric 122 to the chip that is actually doing the recirculation/loopback with internal loopback interface 116.

At 416, chip 104-1 sends the second packet to internal loop-back interface 116. At 418, internal loop-back interface 116 may change the metadata of the second packet to indicate that the packet is a forwarded packet. In this case, chip 104-1 considers the packet as being forwarded and not a mirrored packet from monitoring function 110. In some examples, internal loop-back interface 116 may change the metadata from an identification that indicates the second packet is a mirrored packet to an identification that indicates the second packet is a forwarded packet. Then, internal loop-back interface 116 sends the second packet through a port to ingress pipeline 108.

At 422, chip 104-1 determines the second group address from the metadata in the second packet. Further, chip 104-1 may determine that the packet is a forwarded packet instead of a mirrored packet. For example, ingress pipeline 108 may use the internal metadata to identify the second packet as a forwarded packet and also identify the second group address. At 424, chip 104-1 processes the second packet based on the metadata to send a copy of the second packet to multiple destinations defined by a second group address.

Accordingly, chip 104-1 uses internal loop-back interface 116 with a loop-back function to send a second packet generated by monitoring function 110 to a group address. Recirculation of the packet internally to chip 104-1 allows chip 104-1 to process the packet as a forwarded packet and not a mirrored packet. Thus, chip 104-1 is not restricted from sending a forwarded packet to a destination.

Figure 5A:
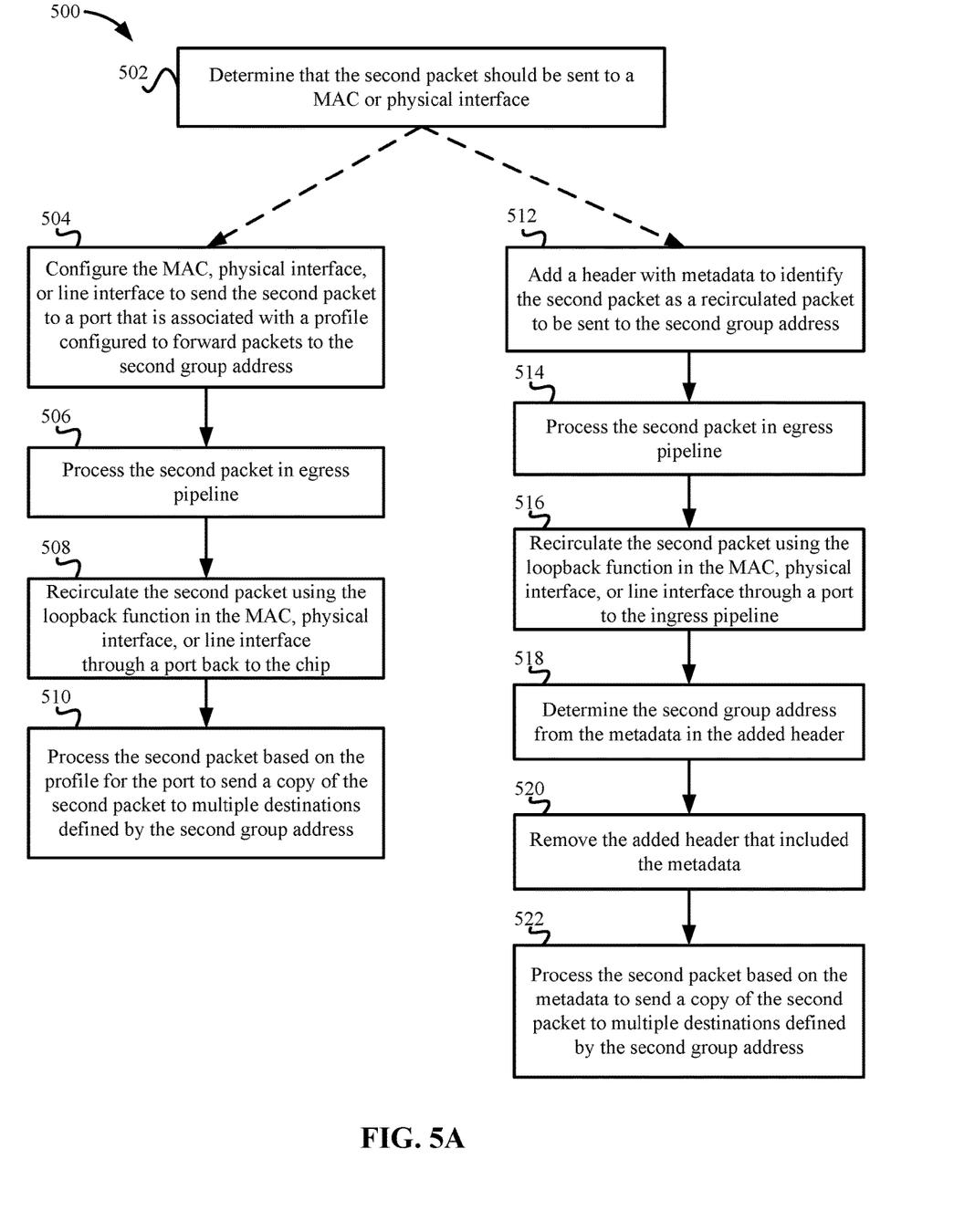
FIG. 5A depicts a simplified flowchart of a method for processing a second packet using a MAC, physical layer interface, or line interface according to some embodiments.

Media Access Controller, Physical Layer Interface, Line Interface Loop-Back Function FIG. 5A depicts a simplified flowchart 500 of a method for processing a second packet using media access controller 118, physical layer interface 120, and/or the line interface according to some embodiments. At 502, chip 104-1 determines that the second packet should be sent to media access controller 118, physical layer interface 120, or the line interface. As discussed above, media access controller 118, physical layer interface 120, and/or the line interface may use loop-back functions.

Figure 5B:
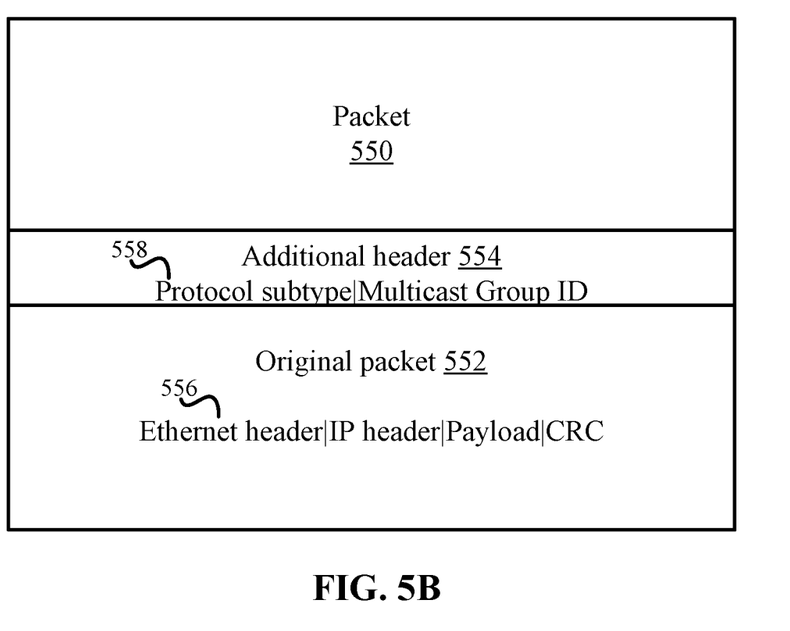
FIG. 5B depicts an example of a packet with an additional header according to some embodiments.

The loop-back function may be implemented in media access controller 118, physical layer interface 120, and/or the line interface using different methods. For example, similar to internal loop-back interface 116, a profile can be configured to send all packets received from a port of media access controller 118, physical layer interface 120, and/or the line interface to a specific group address. Alternatively, chip 104-1 may add a header with metadata to identify the second packet as a forwarded packet to be sent to a specific group address. FIG. 5B depicts an example of a packet 550 with an additional header 554 according to some embodiments. Packet 550 includes an original packet 552, which includes an Ethernet header, IP header, payload, error checking information (e.g., cyclic redundancy check (CRC), and other information. Chip 104-1 adds additional header 554 to identify the second packet as a forwarded packet. For example, additional header 554 includes a protocol subtype and multicast group ID at 558. The protocol subtype indicates the packet is a forwarded packet and a multicast group ID follows.

In some embodiments, additional header 554 that is added to the second packet is different from the internal metadata that is added in the process and used by internal loop-back interface 116. This is because chip 104-1 sends the second packet externally to media access controller 118, physical layer interface 120, and/or the line interface and chip 104-1 strips the internal metadata from the second packet before sending the second packet external to chip 104-1. The internal metadata may be stripped because the packet has to leave chip 104-1 to a line interface (or MAC). This requires the packet to have a proper network header. The internal metadata encodes which multicast group in which the packet should be sent. Information for the multicast group should be transcoded into fields in a valid Ethernet header, which is added as additional header 554. It is noted that if media access controller 118 is internally located in chip 104-1, then the internal metadata may not need to be stripped. In some embodiments, chip 104-1 may add a header on top of the second packet, such as an Ethernet header that may include the metadata. The Ethernet header may be used in forwarding the second packet.

When a profile is configured, at 504, chip 104-1 configures media access controller 118, physical layer interface 120, and/or the line interface to send the second packet to a port that is associated with the profile. The profile includes information that forwards packets to a second group address. That is, every packet received at a port is forwarded to the second group address.

At 506, chip 104-1 processes the second packet in egress pipeline 114. For example, chip 104-1 may send the second packet via fabric interface 115 and/or fabric 122 to egress pipeline 114. The reason the second packet is sent via egress pipeline 114 is that the second packet is being sent external to chip 104-1 and not internally recirculated. Packets being sent external to chip 104-1 are processed through egress pipeline 114.

At 508, media access controller 118, physical layer interface 120, and/or the line interface recirculates the second packet using a loop-back function to recirculate the second packet through a port to chip 104-1. For example, media access controller 118 may be configured to recirculate packets that are received at a port to back to chip 104-1. Similarly, physical layer interface 120 may be configured to recirculate packets that are received at a port back to chip 104-1. The line interface recirculates the packets via line 132 back to chip 104-1. Either media access controller 118 or physical layer interface 120 may have an internal loop-back configuration to perform the recirculation. Further, line interface may send a packet out to a physical line 132, which then recirculates packets back to the line interface.

Once the recirculation is performed, chip 104-1 receives the second packet. At 510, chip 104-1 processes the second packet based on the profile for the port in ingress pipeline 108. For example, since every packet received by the port is sent to a second group address, chip 104-1 may determine the packet is forwarded to the second group address automatically. Then, chip 104-1 sends a copy of the second packet to multiple destinations defined by the second group address. For example, if a user device is being monitored, packets may be multicast and one copy of the packets are sent to the device's address. These packets are then mirrored and recirculated. The recirculated packets are then sent to a second multicast group. The second multicast group may include devices that are monitoring the traffic being sent to the user device.

In another method, metadata may be added to the second packet to allow chip 104-1 to determine where to send the second packet upon recirculation. For example, at 512, chip 104-1 adds a header with metadata to identify the second packet as a forwarded packet to be sent to a second group address. As discussed above, the header may be added on top of the packet, such as an Ethernet header.

At 514, chip 104-1 processes the second packet in egress pipeline 114. Similar to the above-described process, the second packet is being sent external to chip 104-1 and is processed in egress pipeline 114. The second packet may also be sent through fabric interface 115 and fabric 122 to egress pipeline 114.

At 516, the second packet is recirculated using a loop-back function in media access controller 118, physical layer interface 120, and/or the line interface through a port to ingress pipeline 108. The functions described above to perform the loop-back function may also be used in this method.

Chip 104-1 then receives the second packet upon recirculation. The second packet includes the added header. Then, at 518, chip 104-1 determines a second group address from the metadata in the added header. At 520, chip 104-1 removes the added header that included the metadata. The added header is not used to send the second packet and should be removed. At 522, chip 104-1 processes the second packet based upon the metadata to send a copy of the second packet to multiple destinations defined by the second group address.

Accordingly, chip 104-1 uses external loop-back interfaces with a loop-back function to send a second packet generated by monitoring function 110 to a group address. Recirculation of the packet external to chip 104-1 allows chip 104-1 to process the packet as a forwarded packet and not a mirrored packet. Thus, chip 104-1 is not restricted from sending a forwarded packet to a destination.

Multiple Chips

It is noted that the above processes were described with respect to chip 104-1. However, it is noted that multiple chips 104 may be used in the process. For example, internal loop-back interface 116, media access controller 118, physical layer interface 120, and/or the line interface may be used via a different chip 104-2. That is, the second packet may be sent to fabric interface 115 and fabric 122 to chip 104-2, which can then send the second packet via egress pipeline 114 to media access controller 118, physical layer interface 120, and/or the line interface. Further, chip 104-2 may use its own loop-back interface 116 to process the second packet. Also, chip 104-2 may also process the second packet upon recirculation. That is, media access controller 118, physical layer interface 120, and/or the line interface may send the second packet to chip 104-2 instead of chip 104-1. Different variations of the processing using multiple chips 104 may be appreciated.

CONCLUSION

Accordingly, when a chip 104 does not natively support sending a mirrored packet from monitoring function 110 to a group address, a loop-back function is used to overcome this restriction. This allows chip 104 to use monitoring function 110 and be able to send the second packet to a different group address by changing the second packet from a mirrored packet to a forwarded packet using the interface loop-back function. This provides functionality that is not natively included in chip 104.

Example Embodiments

In some embodiments, a method for processing packets, the method comprising: receiving, by a computing device, a first packet; processing, by the computing device, the first packet via an ingress pipeline; generating, by the computing device, a first copy of the first packet as a second packet; sending, by the computing device, second copies of the first packet to a first group of multiple destinations defined by a first multicast address, wherein computing device does not support sending the second packet to a second multicast address; sending, by the computing device, the second packet to an interface with a loopback function, wherein the loopback function sends the second packet back to the ingress pipeline; processing, by the computing device, the second packet via the ingress pipeline, wherein processing the second packet through the ingress pipeline assigns a destination of the second multicast address; and sending, by the computing device, copies of the second packet to a second group of multiple destinations defined by the second multicast address.

In some embodiments, the method further comprising: adding metadata to the second packet to allow the ingress pipeline to assign the destination of the second multicast address.

In some embodiments, the metadata is added to internal metadata that is used internally in a chip processing the second packet.

In some embodiments, the metadata is added to a header that is added to the second packet.

In some embodiments, the metadata identifies the second multicast address.

In some embodiments, the metadata identifies the second packet as a mirrored packet that is generated from the first packet, and the metadata is changed to identify the second packet as a forwarded packet based on the loopback function sending the second packet back to the ingress pipeline.

In some embodiments, a profile is associated with the interface with the loopback function with information to allow the ingress pipeline to assign the destination of the second multicast address.

In some embodiments, the interface with the loopback function comprises a loopback interface within a chip that processes the second packet via the ingress pipeline.

In some embodiments, the interface with the loopback function comprises an interface external to a chip that processes the second packet via the ingress pipeline.

In some embodiments, the interface with the loopback function comprises a media access controller interface that processes the second packet via the ingress pipeline.

In some embodiments, the interface with the loopback function comprises a physical layer interface external to a chip that processes the second packet via the ingress pipeline, the physical layer interface performing the loopback function.

In some embodiments, the interface with the loopback function comprises a line interface external to a chip that processes the second packet via the ingress pipeline, wherein a physical connection device coupled to the line interface performs the loopback function.

In some embodiments, a method for processing packets, the method comprising: processing, by a computing device, a first packet; generating, by the computing device, a first copy of the first packet as a second packet; sending, by the computing device, second copies of the first packet to a first group of multiple destinations defined by a first address; sending, by the computing device, the second packet to an interface with a loopback function, wherein the interface recirculates the second packet for further processing; processing, by the computing device, the second packet, wherein the second packet is assigned a destination of a second address; and sending, by the computing device, copies of the second packet to a second group of multiple destinations defined by the second address.

In some embodiments, the method further comprising: adding metadata to the second packet to allow the second packet to be assigned the destination of the second address.

In some embodiments, the metadata is added to internal metadata that is used internally in a chip processing the second packet.

In some embodiments, the metadata is added to a header that is added to the second packet.

In some embodiments, the metadata identifies the second address.

In some embodiments, the metadata identifies the second packet as a mirrored packet that is generated from the first packet, and the metadata is changed to identify the second packet as a forwarded packet based on the interface recirculating the second packet for further processing.

In some embodiments, a profile is associated with the interface with the loopback function with information to allow the second packet to be assigned the destination of the second address.

In some embodiments, the interface with the loopback function comprises a loopback interface within a chip that generates the second packet.

In some embodiments, the interface with the loopback function comprises an interface external to a chip that generates the second packet.

In some embodiments, the interface with the loopback function comprises a media access controller interface that generates the second packet.

In some embodiments, the interface with the loopback function comprises a physical layer interface external to a chip that processes the second packet via the ingress pipeline, the physical layer interface performing the loopback function.

In some embodiments, the interface with the loopback function comprises a line interface external to a chip that processes the second packet via the ingress pipeline, wherein a physical connection device coupled to the line interface performs the loopback function.

In some embodiments, the method further comprising: generating the copies of the first packet for a first multicast to the first group of the multiple destinations; and generating copies of the second packet for a second multicast to the second group of the multiple destinations.

In some embodiments, a first ingress pipeline processes the first packet, and the second packet is received at the ingress pipeline after the interface recirculates the second packet for further processing.

In some embodiments, a first ingress pipeline is associated with a first chip, and the second packet is sent to a second ingress pipeline of another chip after the interface recirculates the second packet for further processing.

In some embodiments, a first chip generates the second packet, and the second packet is sent to the interface with the loopback function of another chip.

In some embodiments, a non-transitory computer-readable storage medium having stored thereon computer executable instructions, which when executed by a computing device, cause the computing device to be operable for: processing a first packet; generating a first copy of the first packet as a second packet; sending second copies of the first packet to a first group of multiple destinations defined by a first address; sending the second packet to an interface with a loopback function, wherein the interface recirculates the second packet for further processing; processing the second packet, wherein the second packet is assigned a destination of a second address; and sending copies of the second packet to a second group of multiple destinations defined by the second address.

In some embodiments, further operable for: adding metadata to the second packet to allow the second packet to be assigned the destination of the second address.

In some embodiments, a profile is associated with the interface with the loopback function with information to allow the second packet to be assigned the destination of the second address.

In some embodiments, an apparatus for processing packets comprising: one or more computer processors; and a computer-readable storage medium comprising instructions for controlling the one or more computer processors to be operable for: processing a first packet; generating a first copy of the first packet as a second packet; sending second copies of the first packet to a first group of multiple destinations defined by a first address; sending the second packet to an interface with a loopback function, wherein the interface recirculates the second packet for further processing; processing the second packet, wherein the second packet is assigned a destination of a second address; and sending copies of the second packet to a second group of multiple destinations defined by the second address.

In some embodiments, further operable for: adding metadata to the second packet to allow the second packet to be assigned the destination of the second address.

In some embodiments, a profile is associated with the interface with the loopback function with information to allow the second packet to be assigned the destination of the second address.

System

Figure 6:
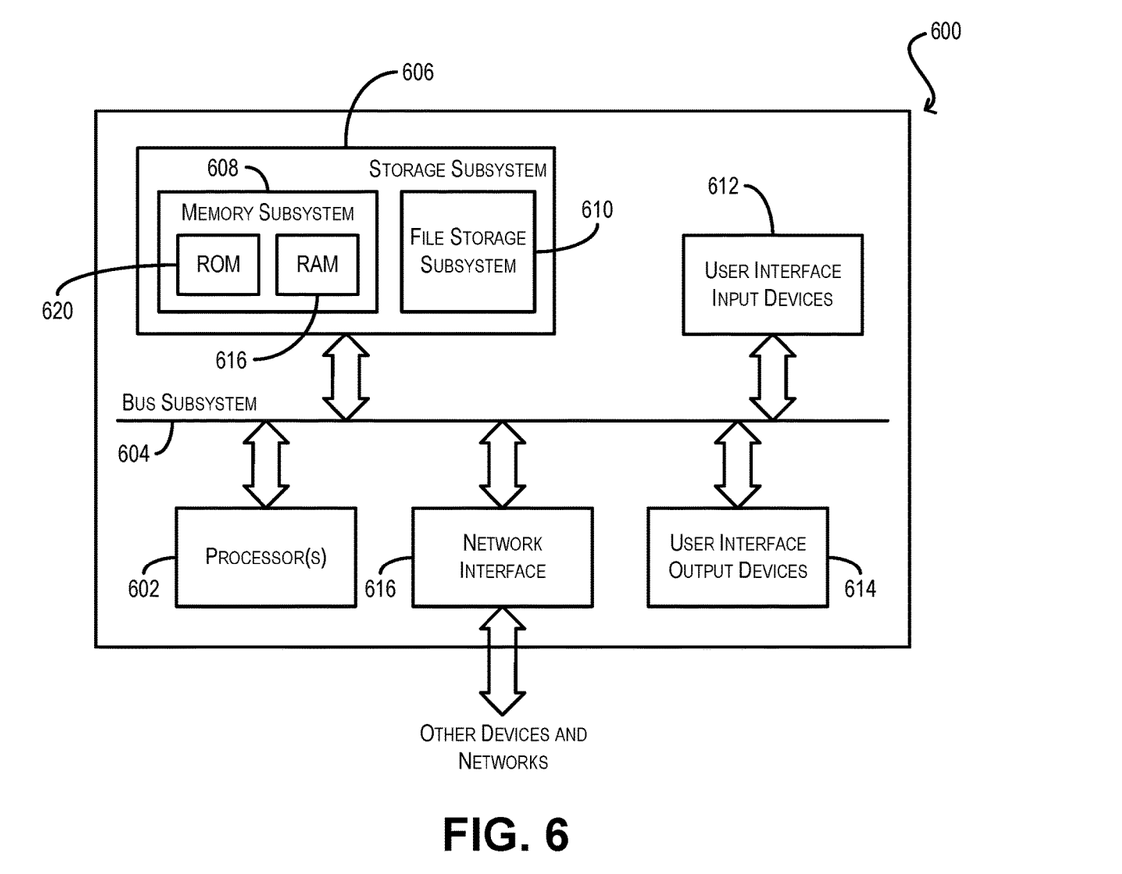
FIG. 6 depicts an example computer system according to some embodiments.

FIG. 6 depicts an example computer system 600 according to some embodiments. Computer system 600 can be used to implement any of the computing devices, systems, or servers described in the foregoing disclosure. As shown in FIG. 6, computer system 600 includes one or more processors 602 that communicate with a number of peripheral devices via a bus subsystem 604. These peripheral devices include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple buses.

Network interface subsystem 616 can serve as an interface for communicating data between computer system 600 and other computer systems or networks. Embodiments of network interface subsystem 616 can include, e.g., an Ethernet card, a Wi-Fi and/or cellular adapter, a modem (telephone, satellite, cable, ISDN, etc.), digital subscriber line (DSL) units, and/or the like.

User interface input devices 612 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 600.

User interface output devices 614 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 600.

Storage subsystem 606 includes a memory subsystem 608 and a file/disk storage subsystem 610. Subsystems 608 and 610 represent non-transitory computer-readable storage media that can store program code and/or data that provide the functionality of embodiments of the present disclosure.

Memory subsystem 608 includes a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than system 600 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method for processing packets, the method comprising:
   receiving a first packet having a first group address;
   processing, in an ingress pipeline, the first packet, the processing including:
      generating a monitoring packet based on the first packet, the monitoring packet including a second group address;
      producing multicast packets based on the first packet;
      sending the multicast packets to a first group of multiple destinations associated with the first group address; and
      sending the monitoring packet to an interface with a loopback function based on the second group address, wherein the loopback function sends the monitoring packet back to the ingress pipeline;
   copying, in the ingress pipeline, the monitoring packet to produce multiple monitoring packets; and
   sending the multiple monitoring packets to a second group of multiple destinations associated with the second group address.

2. The method of claim 1, wherein:
   a first ingress pipeline performs the processing the first packet, and
   the monitoring packet is received at a second ingress pipeline after the interface recirculates the monitoring packet for further processing.

3. The method of claim 2, wherein:
   the first ingress pipeline is associated with a first chip, and
   the monitoring packet is sent to the second ingress pipeline of another chip.

4. The method of claim 2, wherein:
   a first chip generates the monitoring packet, and
   the monitoring packet is sent to the interface with the loopback function of another chip.

5. The method of claim 1, wherein the interface with the loopback function comprises a loopback interface within a chip that generates the monitoring packet.

6. The method of claim 1, wherein the interface with the loopback function comprises an interface external to a chip that generates the monitoring packet.

7. The method of claim 1, wherein the interface with the loopback function comprises a media access controller interface that generates the monitoring packet.

8. The method of claim 1, wherein the interface with the loopback function comprises a physical layer interface external to a chip that processes the monitoring packet via the ingress pipeline, the physical layer interface performing the loopback function.

9. The method of claim 1, wherein the interface with the loopback function comprises a line interface external to a chip that processes the monitoring packet via the ingress pipeline, wherein a physical connection device coupled to the line interface performs the loopback function.

10. The method of claim 1, further comprising:
    adding metadata to the monitoring packet to allow the monitoring packet to be assigned the destination of the second address.

11. The method of claim 1, wherein a profile is associated with the interface with the loopback function with information to allow the ingress pipeline to assign the destination of the second group address.

12. A network device comprising:
    an ingress pipeline, the ingress pipeline:
       receiving a first packet having a first group address;
       generating a monitoring packet based on the first packet, the monitoring packet including a second group address;
       producing multicast packets based on the first packet, the multicast packets being addressed to a first group of multiple destinations associated with the first group address;
       sending the monitoring packet to an interface with a loopback function based on the second group address;
       receiving the monitoring packet from the interface with the loopback function;
       copying the monitoring packet to produce multiple monitoring packets; and
       sending the multiple monitoring packets to a second group of multiple destinations associated with the second group address; and
    the interface with the loopback function sending the monitoring packet back to the ingress pipeline.

13. The network device of claim 12, wherein the ingress pipeline further adds metadata to the monitoring packet to assign the destination of the second group address.

14. The network device of claim 13, wherein the metadata is added to internal metadata that is used internally in a chip processing the monitoring packet.

15. The network device of claim 13, wherein the metadata is added to a header that is added to the monitoring packet.

16. The network device of claim 13, wherein the metadata identifies the second address.

17. The network device of claim 13, wherein:
    the metadata identifies the monitoring packet as a mirrored packet that is generated from the first packet, and
    the metadata is changed to identify the monitoring packet as a forwarded packet based on the interface recirculating the monitoring packet for further processing.

18. The network device of claim 12, wherein a profile is associated with the interface with the loopback function with information to allow the monitoring packet to be assigned the destination of the second address.

19. The network device of claim 12, wherein the interface with the loopback function comprises a loopback interface within a chip that generates the monitoring packet.

20. A computer-readable, non-transitory storage medium having a program stored thereon, the program being executable by a processor to perform a method, the method comprising:
    receiving a first packet having a first group address;
    generating a monitoring packet based on the first packet, the monitoring packet including a second group address;
    producing multicast packets based on the first packet;
    sending the multicast packets to a first group of multiple destinations associated with the first group address;
    sending the monitoring packet to an interface with a loopback function based on the second group address, wherein the loopback function sends the monitoring packet back to the ingress pipeline;

copying the monitoring packet to produce multiple monitoring packets; and sending the multiple monitoring packets to a second group of multiple destinations associated with the second group address.

* * * * *